(12) United States Patent
Nam et al.

(10) Patent No.: US 8,792,164 B2
(45) Date of Patent: Jul. 29, 2014

(54) POLARIZING PLATE, FABRICATION METHOD THEREOF, AND DISPLAY DEVICE USING THE SAME

(75) Inventors: Sung-Hyun Nam, Daejeon (KR); Ki-Ok Kwon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 225 days.

(21) Appl. No.: 13/369,953

(22) Filed: Feb. 9, 2012

(65) Prior Publication Data

US 2012/0206804 A1 Aug. 16, 2012

(30) Foreign Application Priority Data

Feb. 10, 2011 (KR) .................. 10-2011-0011993

(51) Int. Cl.
*G02B 5/30* (2006.01)
*G02F 1/1335* (2006.01)
(52) U.S. Cl.
CPC ........ *G02B 5/3033* (2013.01); *G02F 1/133528* (2013.01); *G02F 2202/28* (2013.01); *G02F 2001/133507* (2013.01)
USPC ................. 359/485.03; 359/485.05
(58) Field of Classification Search
None
See application file for complete search history.

(56) References Cited

U.S. PATENT DOCUMENTS

| | | |
|---|---|---|
| 2007/0177071 A1 | 8/2007 | Egi et al. |
| 2007/0264447 A1 | 11/2007 | Oya |
| 2010/0103518 A1* | 4/2010 | Uejima et al. ................. 359/486 |
| 2011/0051034 A1* | 3/2011 | Egi et al. ......................... 349/61 |
| 2012/0305181 A1* | 12/2012 | Nam et al. .................... 156/305 |
| 2013/0279003 A1* | 1/2013 | Chou et al. ............... 359/483.01 |
| 2013/0244041 A1* | 9/2013 | Cho et al. ...................... 428/412 |

FOREIGN PATENT DOCUMENTS

| | | |
|---|---|---|
| CN | 101013222 B | 1/2011 |
| JP | 2000227521 A | 8/2000 |
| JP | 2006-124528 A | 5/2006 |
| JP | 2009-205141 A | 9/2009 |
| TW | 200941049 A | 10/2009 |
| WO | 2006025548 A1 | 3/2006 |
| WO | 2006038404 A1 | 4/2006 |

* cited by examiner

*Primary Examiner* — Frank Font
(74) *Attorney, Agent, or Firm* — McKenna Long & Aldridge, LLP

(57) ABSTRACT

A polarizing plate, a fabrication method thereof, and a display device using the same are provided. The polarizing plate includes a polarizing element, a first adhesive layer formed on one surface of the polarizing element, a second adhesive layer formed on the other surface of the polarizing element, a protective film attached to an upper portion of the first adhesive layer, a bonding layer attached to a lower portion of the second adhesive layer, and a luminance enhancement film attached to the bonding layer.

22 Claims, 4 Drawing Sheets

POLARIZING PLATE, FABRICATION METHOD THEREOF, AND DISPLAY DEVICE USING THE SAME

CROSS-REFERENCE TO RELATED APPLICATIONS

This application is a Utility Application that claims the benefit of Korean Application No. 10-2011-0011993, filed on Feb. 10, 2011, which is hereby incorporated by reference for all purposes as if fully set forth herein.

BACKGROUND OF THE INVENTION

1. Field of the Invention

The present invention relates to a polarizing plate used in a display device and a fabrication method thereof, and more particularly, to a polarizing plate having an enhanced light leakage which occurs as the polarizing plate is bent when a luminance enhancement film is laminated thereon, and a fabrication method thereof.

2. Description of the Related Art

In general, a polarizing plate is formed by attaching a triacetylcellulose (TAC) film as a protective film to a polarizer in which polyvinyl alcohol (PVA)-based molecule chains are oriented in a certain direction and which have a structure containing an iodine-based compound or a dichroic polarizing material. Here, in general, the polarizer and the protective film are attached by a water-based adhesive configured as a PVA-based aqueous solution.

Meanwhile, in relation to the use of such a polarizing plate in a liquid crystal display (LCD), or the like, a technique of attaching a luminance enhancement film such as a DBEF film to 3M Company to one surface of the polarizing film to use the same for the purpose of luminance enhancement has been proposed. However, when the luminance enhancement film is attached to the related art polarizing plate, a curling phenomenon (referred to as negative directional curling, hereafter), in which a central surface of the polarizing plate becomes downwardly concave, occurs due to a high shrinkage rate of the luminance enhancement film. If such negative directional curling occurs on the polarizing film, when a liquid crystal panel is mounted on a module of the LCD, a corner portion of the liquid crystal panel comes off due to the curled polarizing plate so as to be brought into contact with a case, and as a result, a great deal of stress is formed at the corner portion to cause a corner light leakage phenomenon. Such a corner light leakage phenomenon causes a defective image.

SUMMARY OF THE INVENTION

An aspect of the present invention provides a luminance enhancement film-attached polarizing plate capable of improving a corner light leakage phenomenon by controlling the direction of curling generated when a luminance enhancement film is attached, a fabrication method thereof, and a display device using the same.

According to an aspect of the present invention, there is provided a polarizing plate including: a polarizing element; a first adhesive layer formed on one surface of the polarizing element; a second adhesive layer formed on the other surface of the polarizing element; a protective film attached to the first adhesive layer; a bonding layer attached to the second adhesive layer; and a luminance enhancement film attached to the bonding layer.

The first and second adhesive layers may be made of the same material, but the present invention is not limited thereto.

The polarizing element may be a polyvinyl alcohol (PVA)-based polarizing film in which molecule chains containing an iodine-based compound or dichroic polarizing material are oriented in a certain direction.

The first and second adhesive layers may be made of an adhesive resin including one or more types selected from the group consisting of a polyvinyl alcohol (PVA)-based resin, an acrylic resin, a vinylacetate-based resin, and a UV-curing resin.

The first and second adhesive layers may be made of an adhesive resin including a PVA resin having an acrylic group and a hydroxyl group.

The first and second adhesive layers may be made of an adhesive resin including 100 parts by weight of a PVA-based resin and 0.01 to 10 parts by weight of a compound having an epoxy group and an acrylic group.

The adhesive resin may additionally include an initiator configured as an AIBN-based initiator and/or a persulfate-based water-soluble initiator, and in this case, a maximum 10 wt % of the initiator based on the weight of the adhesive resin may be added.

The protective film may be made of one or more types selected from the group consisting of a polyester-based polymer, a styrene-based polymer, a cellulose-based polymer, a polyethersulfone-based polymer, a polycarbonate-based polymer, an acrylic polymer, a polyolefin-based polymer, a polyamide-based polymer, a polyimide-based polymer, a sulfone-based polymer, a polyether sulfone-based polymer, a polyether ether ketone-based polymer, a polyphenylene sulfide-based polymer, a vinyl alcohol-based polymer, a vinylidene chloride-based polymer, a vinyl butyral-based polymer, an arylate-based polymer, a polyoxymethylene-based polymer, an epoxy-based polymer, or any mixture thereof.

The bonding layer may be made of one or more types selected from the group consisting of an acrylic copolymer, an epoxy-based resin, a polyurethane-based resin, a silicon-based resin, a polyether-based resin, a polyamide-based resin, and a PVA-based resin.

The bonding layer may be configured as a single layer, or may include two bonding layers, i.e., first and second bonding layers, each having a different modulus.

The modulus of the first bonding layer may range from about 1 to 500 MPa, the modulus of the second bonding layer may range from about 0.01 to 0.5 MPa, and the first bonding layer having a greater modulus value may be attached to the second adhesive layer.

The luminance enhancement film may be a multilayer reflective polarizer, a multilayer reflective film, or a nanowire grid polarizer.

According to another aspect of the present invention, there is provided a method for fabricating a polarizing plate, including: positioning a protective film on one surface of a polarizing element and positioning a bonding layer on the other surface of the polarizing element; interposing an adhesive between the protective film and the polarizing element and between the bonding layer and the polarizing element; attaching the protective film and the bonding layer to the polarizing element by the medium of the adhesive and drying the same; and attaching a luminance enhancement film to the bonding layer.

The drying may be performed at 20° C. to 100° C., or may be performed at 40° C. to 90° C.

According to another aspect of the present invention, there is provided a display device including the foregoing polarizing plate. The display device may be a liquid crystal display (LCD) or an organic electroluminescence (EL), and in the case of the LCD, a driving mode may be an in-plane switching (IPS) mode, a twisted nematic (TN) mode, a vertically aligned (VA) mode, or a fringe field switching (FFS) mode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
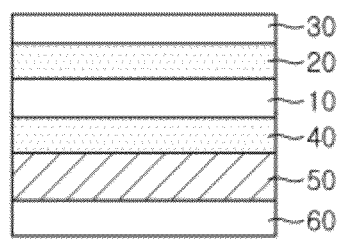
FIG. 1 is a view showing an example of a polarizing plate according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated, reduced, or omitted for clarity, and the same reference numerals will be used throughout to designate the same or like components.

FIG. 1 is a view showing an example of a polarizing plate according to an embodiment of the present invention. As shown in FIG. 1, a polarizing plate 1 according to an embodiment of the present invention includes a polarizing element 10, a first adhesive layer 20, a second adhesive layer 40, a protective film 30, a bonding layer 50, and a luminance enhancement film 60.

In detail, as shown in FIG. 1, the polarizing plate 1 has a structure in which the protective film 30 is attached only to one surface of the polarizing element 10 and the bonding layer is directly attached to the adhesive layer without a protective film. Research conducted by the inventors of the present application showed that, as in the polarizing plate according to an embodiment of the present invention, in case of attaching protective film only to one surface of the polarizing element, the polarizing plate can become advantageously thinner and more lightweight and a light leakage phenomenon is significantly improved as curling occurs in a positive direction, unlike the related art in which the luminance enhancement film is attached to the polarizing plate in which protective film is attached to both surfaces of the polarizing element.

The polarizing element 10 refers to an optical element allowing only light having a particular polarized state to pass therethrough, for which, in general, a PVA-based polarizing film in which molecule chains containing an iodine-based compound or dichroic dye are oriented in a certain direction is used. Such a polarizing film is fabricated by dyeing an iodine or dichroic dye on a PVA-based film and stretching the same in a certain direction, and cross-linking the same. Here, the degree of polymerization of the PVA is not particularly limited, yet in consideration of freedom in movement of molecules and flexible mixture with the containing material, it ranges preferably, from about 1,000 to 10,000, and more preferably, from about 1,500 to 5,000.

The first adhesive layer 20, which serves to attach the protective film 30 to be described and the polarizing element 10, is formed on one surface of the polarizing element 10.

Meanwhile, the second adhesive layer 40, which serves to attach the polarizing element 10 and the bonding layer 50, is formed on a surface of the polarizing element 10 on which the first adhesive layer 20 is not formed.

In an embodiment of the present invention, preferably, the first adhesive layer 20 and the second adhesive layer 40 are made of an adhesive resin of the same material, but the present invention is not limited thereto. When the adhesive layers made of the same material are formed on both surfaces of the polarizing element 10, since shrinkage of the both adhesive layers is identical, the same force is applied to the polarizing element 10 after drying, and as a result, generation of curling due to contraction of the adhesive, or the like, can be minimized.

Meanwhile, the adhesive resin forming the first adhesive layer 20 and the second adhesive layer 40 is not particularly limited. Namely, an adhesive resin which has excellent optical transmission and is not changed, such as yellowed, or the like, over time, may be used. For example, in an embodiment of the present invention, the first adhesive layer 20 may be formed by using an adhesive resin including a polyvinyl alcohol-based resin, an acrylic resin, a vinyl acetate-based resin, and/or a UV-curing resin, or the like, and in this case, the adhesive resins may be water-based adhesives or solventless type adhesives.

However, among them, in particular, a water-based adhesive including a PVA-based resin is preferably used, and an adhesive resin including a PVA-based resin (referred to as an 'AH-PVA resin', hereinafter) having acrylic group or a hydroxyl group or an adhesive resin including a PVA-based resin and a compound having an acrylic group and an epoxy group may be more preferably used. The adhesive resin including the AH-PVA resin or the adhesive resin including the PVA-based resin and a compound having an acrylic group and an epoxy group has advantages in that it has excellent adhesive strength, water resistance, and moisture resistance as well as having excellent solubility over water.

In detail, the AH-PVA resin used in an embodiment of the present invention may include a recurring unit expressed by Chemical Formula 1a shown below and a recurring unit expressed by Chemical Formula 1b shown below, and selectively additionally includes a recurring unit expressed by Chemical Formula 1c shown below.

[Chemical Formula 1a]

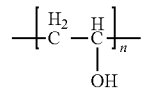

-continued

[Chemical Formula 1b]

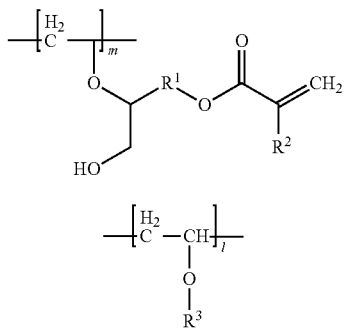

[Chemical Formula 1c]

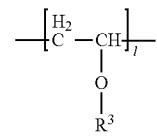

Here, in the above Chemical Formulas, $R^1$ may be a substituted or unsubstituted $C_1$-$C_{20}$ alkandiyl; a substituted or unsubstituted 1 to 7-membered cyclic compound; a substituted or unsubstituted 1 to 7-membered heterocyclic compound including a hetero atom selected from the group consisting of N, S, and O; a substituted or unsubstituted $C_6$-$C_{14}$ aromatic compound; or a substituted or unsubstituted 1 to 7-membered hetero aromatic compound including a hetero atom selected from the group consisting of N, S, and O, and $R^2$ may be a substituted or unsubstituted $C_1$-$C_{20}$ alkyl group; a substituted or unsubstituted 1 to 7-membered cyclic compound; a substituted or unsubstituted 1 to 7-membered heterocyclic compound including a hetero atom selected from the group consisting of N, S, and O; a substituted or unsubstituted $C_6$-$C_{14}$ aromatic compound; or a substituted or unsubstituted 1 to 7-membered hetero aromatic compound including a hetero atom selected from the group consisting of N, S, and O. When $R^1$ and $R^2$ are substituted with a substituent, the substituent may be a $C_1$-$C_{20}$ alkyl group or a halogen atom selected from the group consisting of F, Cl, Br, and I, and $R^3$ may be an acetoacetyl group, a carboxylic acid group, an acryl group, or a urethane group.

Meanwhile, when the AH-PVA resin includes the recurring unit expressed by Chemical Formula 1a and the recurring unit expressed by Chemical formula 1b, preferably, n is an integer ranging from 480 to 1700, m is an integer ranging from 10 to 900, and n+m is an integer ranging from 500 to 1800. When the AH-PVA resin includes the recurring unit expressed by Chemical Formula 1a, the recurring unit expressed by Chemical Formula 1b, and the recurring unit expressed by Chemical Formula 1c, preferably, n is an integer ranging from 480 to 1700, m is an integer ranging from 10 to 900, l is an integer ranging from 1 to 80, n+m is an integer ranging from 500 to 1800, n+l is an integer ranging from 490 to 1700, and n+m+l is an integer ranging from 500 to 1800 in the Chemical Formulas.

Meanwhile, the recurring units expressed by Chemical Formulas 1a, 1b, and 1c may be randomly arranged within the AH-PVA resin polymer.

Meanwhile, in the AH-PVA resin, the acrylic group may be contained to be 0.1~50 mol %, preferably, 0.1~20 mol %, and more preferably, 0.1~10 mol % of the PVA resin. If the content of the acrylic group in the PVA resin is less than 0.1 mol %, the effect of increasing adhesiveness, moisture resistance, water resistance according to the inclusion of the acrylic group cannot be obtained, and if the content of the acrylic group exceeds 50 mol %, solubility with respect to water would be degraded and adhesive strength would be reduced.

The AH-PVA resin is obtained by modifying a PVA-based resin with a compound having an epoxy group and an acrylic group. Here, as the compound having an epoxy group and an acrylic group, the compound of Chemical Formula 3 shown below may be used. $R^1$ and $R^2$ in Chemical Formula 3 are defined to be the same as that described above.

[Chemical Formula 3]

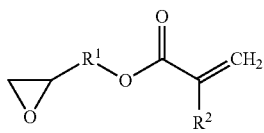

In detail, the AH-PVA resin according to an embodiment of the present invention may be prepared by the following Reaction Formula 1.

[Reaction Formula 1]

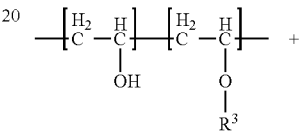

[Chemical Formula 2]

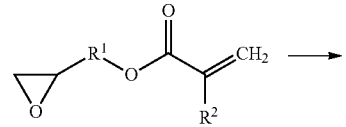

[Chemical Formula 3]

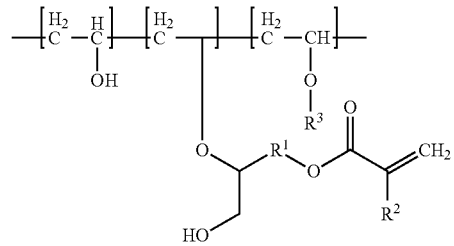

[Chemical Formula 1]

Reaction Formula 1 expresses the process of being changed the related art PVA-based resin into the AH-PVA resin and the number of recurring units is not mentioned. In Reaction Formula 1, Chemical Formula 2 is a PVA-based resin. The PVA-based resin used in an embodiment of the present invention is not particularly limited and an arbitrary PVA-based resin, e.g., a non-modified PVA resin, a PVA resin modified by at least one type of group selected from the group consisting of an acetoacetyl group, a carboxylic acid group, an acrylic group, and a urethane group, or the like, known in the art to be used in an adhesive for attaching the polarizing element and the protective film in the related art, may be used. When a non-modified PVA-based resin is used as the PVA resin, the recurring unit 1c in Chemical Formula 2 may not exist.

As expressed by Reaction Formula 1, in the reaction of the PVA in Chemical Formula 2 and the compound having the epoxy group and the acryl group in Chemical Formula 3, as the hydroxyl group (—OH) and/or $R^3$ group of PVA are reacted to the epoxy group, the acrylic group is introduced into the PVA resin and the hydroxyl group (—OH) is formed simultaneously.

In detail, as expressed by Reaction Formula 1, when the PVA resin (Chemical Formula 2) and the compound having the epoxy group and the acrylic group (Chemical Formula 3) are dissolved in water and reacted at about 25 to 70 for 10 to 30 hours, the PVA-based resin (Chemical Formula 1) in which the acrylic group has been introduced and the —OH group has been formed can be obtained. Namely, according to the foregoing reaction, the PVA resin in which the acrylic group has been introduced to a backbone of the resin and the —OH group has been formed is obtained, and the PVA-based resin with the acrylic resin introduced into the backbone thereof and —OH group formed therein has excellent water solubility, adhesiveness, water resistance, and moisture resistance.

Meanwhile, preferably, a copolymerization degree of the AH-PVA resin ranges from about 500 to 1800. If the copolymerization degree is less than 500, when an adhesive is prepared, viscosity would be low at a low solid content, so a great amount of solid content should be added. If the copolymerization degree exceeds 1800, when an adhesive is prepared, viscosity would be high, so a small amount of solid content (PVA resin) should be added, and in this case, adhesive strength would be reduced, which is, thus, not desirable.

Meanwhile, as a material for forming the first adhesive layer and the second adhesive layer according to an embodiment of the present invention, an adhesive resin including a PVA-based resin and a compound having an epoxy group and an acrylic group may be used instead of the AH-PVA resin.

In the adhesive resin, the content of the compound having an epoxy group and an acrylic group is 0.001 to 10 parts by weight, preferably, 0.001 to 1 parts by weight over 100 parts by weight of the PVA-based resin.

Meanwhile, the PVA-based resin used in the adhesive resin including a PVA resin and a compound having an epoxy group and an acrylic group is also not particularly limited and an arbitrary PVA-based resin known in the art, e.g., a non-modified PVA resin, a PVA resin modified by at least one type of group selected from the group consisting of an acetoacetyl group, a carboxylic acid group, an acrylic group, and a urethane group, or the like, may be used.

Here, preferably, a copolymerization degree of the PVA-based resin ranges from about 500 to 1800. If the copolymerization degree is less than 500, when an adhesive is prepared, viscosity would be low at a low solid content, so a great amount of solid content should be added. If the copolymerization degree exceeds 1800, when an adhesive is prepared, viscosity would be high, so a small amount of solid content (PVA resin) should be added, and in this case, adhesive strength would be reduced, which is, thus, not desirous.

As the compound having an epoxy group and an acrylic group, the compound of Chemical Formula 3 may be used. If the content of the compound having an epoxy group and an acrylic group is less than 0.001 parts by weight, the effect of increasing adhesiveness, moisture resistance, and water resistance according to the inclusion of the acrylic group could not be obtained, and if the content of the compound having an epoxy group and an acrylic group exceeds 10 parts by weight, water solubility would be too low to obtain a uniform adhesive to be used for a polarizing plate, and because solution stability and adhesive strength thereof are degraded, it is not desirous.

Meanwhile, a curing initiator may be added additionally to the adhesive resin used in an embodiment of the present invention as necessary. As the curing initiator, an AIBN (2,2'-azo-bis(isobutyronitrile))-based initiator, a persulfate-based initiator, an initiator of Darocure and/or Igacure series to Ciba-Geigy Ltd., or the like, may be used. The AIBN and persulfate-based initiators may be used based on water, and any initiator known in the art may be used. The AIBN-based initiator may include, for example, 2,2'-azobis[2-(2-imidazolin-2-yl)propane]dihydrochloride, 2,2'-azobis[2-(2-imidazolin-2-yl)propane]disulfate dihydrate, 2,2'-azobis[N-(2-carboxyethyl)-2-methylpropionamide], 2,2'-azobis[2-(3,4,5,6-tetrahydropyrimidin-2-yl)propane]dihydrochloride, 2,2'-azobis{2-[1-(2-hydroxyethyl)-2-yl]propane}dihydrochloride, 2,2'-azobis {2-methyl-N-[2-(hydroxybutyl)]propionamide}, 2,2'-azobis[2-methyl-N-[2-(hydroxyethyl)propionamide], 2,2'-azobis(N-butyl-2-methylpropionamide), and the like, and as the persulfate-based curing initiator may include, for example, potassium persulfate, ammonium persulfate, and the like, but the present invention is not limited thereto. The initiators to Ciba-Geigy Ltd. may include, for example, hydroxy-1-[4-(hydroxyethoxy)phenol]-2-methyl-1-propanone (Darocure 2959), 2-hydroxy-2-methyl-1-phenylpropan-1-one (Darocure 1173), 1-(4-isopropylphenyl)-2-hydroxy-2-methylpropan-1-one (Darocure 1116), 25:75 blend of bis-(2,6-dimethoxybenzoyl)-2,4,4-trimethylpentyl phosphine oxide and 2-hydroxy-2-methyl-1-phenylpropan-1-one (Brand name: Irgacure 1700), 1-[4-(2-hydroxyethoxy)-phenyl]-2-hydroxy-2-methyl-1-propan-1-one (Irgacure 2959), 1-hydroxycyclohexylphenylketone (Irgacure 184), 2,2-dimethoxy-2-phenylacetophenone (Irgacure 651), and the like, but the present invention is not limited thereto.

The curing initiator may be added to be a maximum 10 wt % based on the total weight of the adhesive resin. The curing initiator is a component arbitrarily added as necessary. Although a lower limit value of the added amount is not limited, preferably, the curing initiator may be added to be preferably 0.01 to 10 wt %, and more preferably, 0.01 to 1 wt % based on the total weight of the adhesive. If the added amount of the curing initiator is less than 0.01 wt %, the effect of adding the curing initiator is insufficient, and when the added amount of the curing exceeds 10 wt %, the additive remaining after the reaction would make a bad influence on the adhesive strength, and thus, not desirous.

Besides, in the adhesive resin, various coupling agents, tackifiers, UV ray absorbents, antioxidants, various stabilizers, and the like, may be combined as necessary.

Next, the protective film 30, a film for protecting the polarizing element 10, is attached to an upper portion of the first adhesive layer 20. As the protective film 30, any polymeric films having excellent optical transparency, mechanical strength, thermal stability, isotropy, adhesive property with a PVA polarizing element, and the like, may be used. For example, a film made of a polyester-based polymer such as polyethylene terephthalate, polyethylene naphthalate, and the like, a styrene-based polymer such as polystyrene, a copolymer of acrylonitrile and styrene, and the like, a cellulose-based polymer such as diacetyl cellulose, triacetyl cellulose, and the like, a polyethersulfone-based polymer, a polycarbonate-based polymer, an acrylic polymer such as polyemthylmethacrylate, and the like, a polyolefin-based polymer such as polyethylene, polypropylene, and a copolymer of ethylene and propylene, an amide-based polymer such as nylon or aromatic polyamide, an imide-based polymer, a sulfone-based polymer, a polyether sulfone-based polymer, a polyether ether ketone-based polymer, a polyphenylene sulfide-based polymer, a vinyl alcohol-based polymer, a vinylidene chloride-based polymer, a vinyl butyral-based polymer, an arylate-based polymer, a polyoxymethylene-based polymer, an epoxy-based polymer, or any mixture thereof may be used as the protective film, but the present invention is not limited thereto.

In particular, a cellulose-based film such as a film of cellulose ester, triacetyl cellulose (TAC), a film of cellulose propionate, cellulose acetate propionate, cellulose diacetate, cellulose acetate butylate, and the like, a polycarbonate-based film (PC film), a polystyrene-based film, a polyarylate-based film, a norbornene resin-based film, and a polysulfone-based film are preferable in the aspect that they are transparent, have mechanical properties, do not have optical anisotropy, and the like. The triacetyl cellulose film (TAC film) and the polycarbonate film (PC film) are more preferable in that they have excellent film forming properties and processability. The TAC film is most preferable due to its polarization characteristics and durability.

The protective film may be surface-modified in order to have improved adhesive strength and adhesion with respect to the polarizing element to which the protective film is attached. The surface treatment may include, for example, a corona treatment, a glow discharge treatment, a flame treatment, acidification, an alkali treatment, a plasma treatment, ultrasonication, UV irradiation, and the like, but the present invention is not limited thereto. Also, in order to enhance adhesive properties, a method of providing an undercoat layer to the protective film may also be used.

The bonding layer 50, which serves to attach the luminance enhancement film 60, is attached to a lower portion of the second adhesive layer 40. As a material of the bonding layer 50, for example, an acrylic copolymer, an epoxy resin, a polyurethane resin, a silicon resin, a polyether resin, a polyamide resin, a polyvinylalcohol resin, and the like, may be used alone or may be mixed together so as to be used. Among them, in particular, the acrylic copolymer is preferably used in consideration of transparency, weatherproof, durability, and adhesion properties, and the like.

Figure 2:
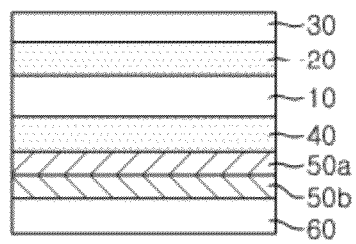
FIG. 2 is a view showing another example of a polarizing plate according to an embodiment of the present invention.

Meanwhile, the bonding layer 50 may have a mono-layer structure as shown in FIG. 1 or may include a first bonding layer 50a and a second bonding layer 50b each having a different modulus as shown in FIG. 2. Here, modulus, a measure indicating elastic characteristics of an arbitrary material, is defined as a proportional coefficient between stress and strain with respect to an arbitrary spatial position and time within a material. Namely, in case of simple tension, when stress is $\sigma$, strain is $\epsilon$, and modulus is E, it may be defined such that $\sigma = E \cdot \epsilon$.

When the bonding layer is formed to have a dual-layer structure, modulus of the first bonding layer may be controlled to be greater than that of the second bonding layer to enhance the protection function of the PVA polarizing element. In other words, the bonding layer having dual-layer structure may have a function of protecting the PVA polarizing element against external environmental factors, such as heat, moisture, or the like, that degrade the polarization function of the PVA polarizing element. Also, a chemical functional group may be added to a gluing agent forming the first bonding layer to improve adhesive strength with respect to the PVA polarizing element and water resistance.

In this case, modulus of the first bonding layer ranges from about 1 to 500 MPa, preferably, ranges from about 50 to 450 MPa, and more preferably, ranges from about 100 to 400 MPa, and modulus of the second bonding layer ranges from about 0.01 to 0.5 MPa, preferably, ranges from about 0.01 to 0.45 MPa, and more preferably, ranges from about 0.01 to 0.4 MPa.

As shown in FIG. 2, when the bonding layer is formed as two layers each having a different modulus, preferably, a bonding layer having a higher modulus value is attached to the second adhesive layer. The bonding layer having a higher modulus is able to enhance adhesive strength with respect to the PVA polarizing element and increase water resistance of the polarizing plate by improving wettability of the second adhesive layer, as well as effectively protecting the PVA polarizing element against external environmental factors such as heat, moisture, or the like. Meanwhile, the bonding layer having a low modulus value may be used to be bonded with the luminance enhancement film.

As the luminance enhancement film 60, general films used to enhance luminance of the display device in the art may be used without limitation. For example, in an embodiment of the present invention, a multilayer reflective polarizer such as a DBEF film manufactured and purchased by 3M, a multilayer reflective film in which a plurality of layers, composed of materials each having a different refractive index, are sequentially laminated, a nano-wire grid polarizer, or the like, may be used as the luminance enhancement film 60.

Here, the multilayer reflective film may have a structure in which one layer has an isotropic structure, another layer has an anisotropic structure, and layers whose refractive index in one direction is greater than refractive index of an isotropic layer are sequentially laminated. Namely, on the assumption that two layers, i.e., first and second layers, exist, when planar refractive indices in two direction on the first layer are $n_{x1}$ and $n_{y1}$, respectively, the first layer is $n_{x1} \approx n_{y1}$, and when planar refractive indices of the second layer are $n_{x2}$ and $n_{y2}$, respectively, the second layer is $n_{y2} > n_{x2}$, and a relationship of $n_{y2} > n_{x2} \approx n_{x1} \approx n_{y1}$ may be established.

Also, the nano-wire grid polarizer may have a configuration in which a nano-structure is formed on a transparent film. Here, the nano-structure may be a metal layer or may have a configuration in which a metal layer is formed on a resin pattern.

The results of research conducted by the inventors of the present application show that the use of the DBEF film to 3M as the luminance enhancement film 60 of the present invention attains a luminance enhancement effect of 40% or more.

A method for fabricating a polarizing plate according to an embodiment of the present invention will be described.

Figure 3:
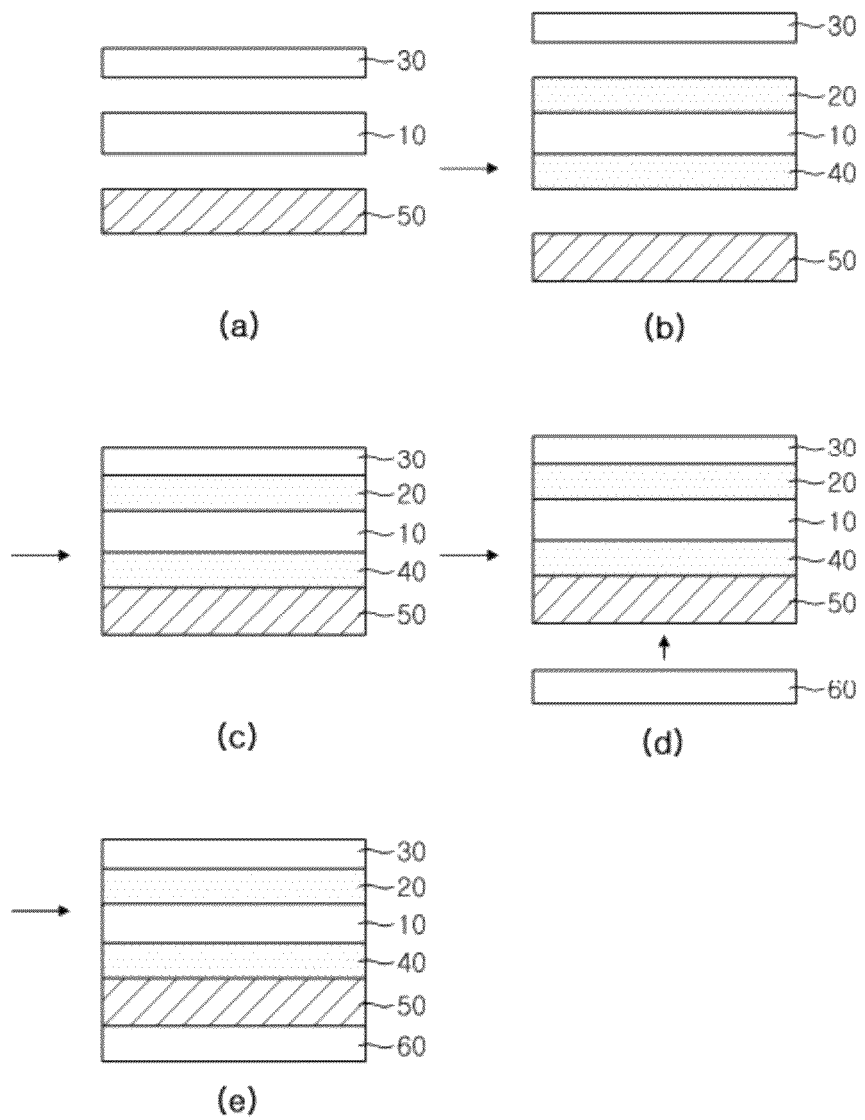
FIG. 3 is a view explaining a method for fabricating a polarizing plate according to an embodiment of the present invention.

FIG. 3 is a view explaining a method for fabricating a polarizing plate according to an embodiment of the present invention. As shown in FIG. 3, the method for fabricating a polarizing plate according to an embodiment of the present invention includes (i) positioning a protective film on one surface of a polarizing element and positioning a bonding layer on the other surface of the polarizing element, (ii) interposing an adhesive between the protective film and the polarizing element and between the bonding layer and the polarizing element, (iii) attaching the protective film and the bonding layer to the polarizing element by the medium of the adhesive and drying the same, and (iv) attaching a luminance enhancement film to the bonding layer.

First, the protective film 30 and the bonding layer 50 are positioned on both sides of the polarizing element 10. In this case, as mentioned above, preferably, the polarizing element 10 is a PVA polarizing film in which molecule chains containing an iodine-based compound or dichroic dye are oriented in a certain direction, and a polymerization degree of the PVA ranges from about 1,000 to 10,000, preferably, ranges from about 1,500 to 5,000.

Also, as the protective film, a film made of a polyester-based polymer such as polyethylene terephthalate, polyethylene naphthalate, and the like, a styrene-based polymer such as polystyrene, a copolymer of acrylonitrile and styrene, and the like, a cellulose-based polymer such as diacetyl cellulose, triacetyl cellulose, and the like, a polyethersulfone-based polymer, a polycarbonate-based polymer, an acrylic polymer such as polyemthylmethacrylate, and the like, a polyolefin-based polymer such as polyethylene, polypropylene, and a copolymer of ethylene and propylene, an amide-based polymer such as nylon or aromatic polyamide, an imide-based polymer, a sulfone-based polymer, a polyether sulfone-based polymer, a polyether ether ketone-based polymer, a polyphenylene sulfide-based polymer, a vinyl alcohol-based polymer, a vinylidene chloride-based polymer, a vinyl butyral-based polymer, an arylate-based polymer, a polyoxymethylene-based polymer, an epoxy-based polymer, or any mixture thereof may be used.

Meanwhile, the bonding layer 50 may be optically transparent and exhibit appropriate viscoelasticity or adhesive properties. A material of the boning layer 50 is not particularly limited. For example, as a material of the bonding layer 50, an acrylic copolymer, an epoxy resin, a polyurethane resin, a silicon resin, a polyether resin, a polyamide resin, a polyvinylalcohol resin, and the like, may be used alone or may be mixed together so as to be used. Among them, in particular, the acrylic copolymer is preferably used in consideration of transparency, weatherproof, durability, and adhesion properties, and the like.

Here, as the bonding layer 50, an adhesive sheet formed by coating a gluing agent on a release film may be used. Here, the adhesive sheet may be fabricated by applying an adhesive resin on a release film and curing the same through a method such as drying, thermal curing, chemical curing, heat fusion, or light curing.

Also, the bonding layer 50 may include the first bonding layer 50a and the second bonding layer 50b each having a different modulus. In this case, modulus of the first bonding layer ranges from about 1 to 500 MPa, preferably, ranges from about 50 to 450 MPa, and more preferably, ranges from about 100 to 400 MPa, and modulus of the second bonding layer ranges from about 0.01 to 0.5 MPa, preferably, ranges from about 0.01 to 0.45 MPa, and more preferably, ranges from about 0.01 to 0.4 MPa.

Next, an adhesive is interposed between the protective film and the polarizing element and between the bonding layer and the polarizing element. In this step, as shown in FIG. 3, the adhesive may be applied to both surfaces of the polarizing element or may be applied to one surface of the protective film and that of the bonding layer facing the polarizing element.

Meanwhile, as mentioned above, the adhesive which has adhesive strength sufficient for attaching the polarizing element and the protective film or attaching the polarizing element and the bonding layer, has excellent optical transmission and is not changed, such as yellowed, or the like, over time, may be used, without being particularly limited. For example, an adhesive including one or more types selected from the group consisting of a PVA-based resin, an acrylic resin, a vinyl acetate-based resin, an a UV curing adhesive resin may be used. Preferably, an adhesive including a PVA-based resin is used, and most preferably, an adhesive including a PVA-based resin containing an acrylic group and an hydroxyl group is used.

When the adhesive is interposed through the foregoing process, the protective film and the bonding layer are attached to the polarizing element by the medium of the adhesive and dried.

Here, a drying temperature may be generally 20 to 100, more preferably, 40 to 90, but it may differ according to an adhesive in use.

Also, if a foreign object exists in attaching the protective film and the bonding layer to the polarizing element and drying the same, the attachment may not be smoothly performed. Thus, preferably, this step is performed in an environment in which a floating foreign object is low or a foreign object removal process may be performed before the attachment step. As the method for removing a foreign object, any method that may not make a bad influence on the polarizing element, the protective film, and the bonding layer may be employed without being particularly limited. For example, in order to remove a foreign object, a cleansing section may be additionally performed during the polarization plate fabrication process to wash out a foreign object from the surface of the films in a cleansing tub filled with water. Alternatively, a method of sloping a film proceeding direction during the process and applying water to flow down on the sloped surface to thus remove a foreign object, a method of cleansing the film and then removing water remaining on the surface of the film by jetting air pressure such as oxygen, nitrogen, or the like, a method for directly jetting air pressure to blow a foreign object to remove it, or the like, may be used.

Meanwhile, in order to perform smooth attachment, preferably, the amount of foreign objects on the contact surface is 1 $g/m^2$ or less per unit area, and more preferably, 0.5 $g/m^2$ or less. Here, the amount of foreign objects refers to weight of foreign objects present per unit surface area.

When drying is completed, the luminance enhancement film 60 is attached to the bonding layer.

Through the foregoing fabrication method, the polarizing plate according to an embodiment of the present invention in which the protective film, the first adhesive layer, the polarizing element, the second adhesive layer, the bonding layer, and the luminance enhancement film are disposed sequentially from above may be fabricated. Unlike the related art luminance enhancement film-attached polarizing plate, in the polarizing plate according to an embodiment of the present invention fabricated through the foregoing method, since a central surface of the polarizing plate is upwardly convex, generating curling in a positive direction, after the luminance enhancement film is attached, a corner light leakage phenomenon can be improved. Also, since only one sheet of protective film is used, the polarizing plate can become thinner and more lightweight.

In addition, when the first and second adhesive layers are made of the AH-PVA resin or the adhesive resin including the PVA resin and the compound having an acrylic group and an epoxy group, the adhesive strength, moisture resistance, water resistance, and the like, of the polarizing plate can be enhanced.

Meanwhile, the polarizing plate according to an embodiment of the present invention may be advantageously used as a polarizing plate of a display device, e.g., as a polarizing plate of an LCD, as an anti-reflective polarizing plate of an organic EL, or the like. Here, the LCD may be used in various driving modes, for example, an in-plane switching (IPS) mode, a twisted nematic (TN) mode, a vertically aligned (VA) mode, or a fringe field switching (FFS) mode, and the like, without a limitation.

Hereafter, the present invention will be described in more detail through specific embodiments. However, of course, the scope of the present invention is not confined or limited to the following embodiments.

Embodiment Example

A PVA film (manufactured by Kurary Co. Ltd., polymerization degree: 2400) was processed in a rinsing tank and a swelling tank, dyed in an aqueous solution containing $I_2$ and KI, and then, stretched five-fold in an aqueous solution containing boron and Kl to obtain a polarizer.

And then, a TAC film having a thickness of 60 micrometers was positioned on one surface of the polarizer and a bonding film protected by a PE release film was positioned on the other surface of the polarizer. Here, the bonding film was configured as a bonding layer including two layers having modulus values of 270 MPa and 0.02 MPa, respectively.

Thereafter, a PVA-based adhesive aqueous solution was put between the polarizer and the TAC film and between the polarizer and the bonding film, attached together by laminator, and then, dried for 8 minutes at 80. And then, the DBEF film to 3M was attached to the bonding film to fabricate the polarizing plate having such a structure as shown in FIG. 2.

Comparative Example

For comparison, a bonding layer having a modulus value of 0.02 MPa was formed on one surface of the related art polarizing plate in which a PVA-based adhesive layer and a TAC film were sequentially laminated on both surfaces of the same PVA film as that of the Embodiment Example, and the DBEF film to 3M was attached to the bonding layer.

Experimental Example 1

Figure 4:
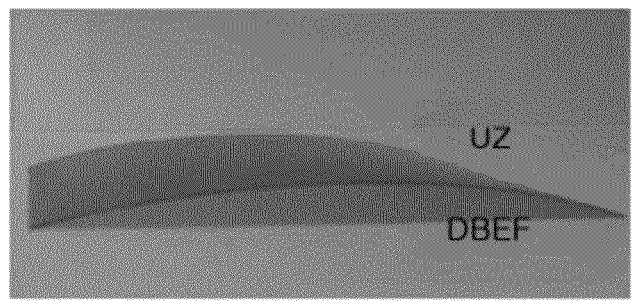
FIG. 4 is a photograph obtained by capturing a polarizing plate fabricated according to Embodiment Example of the present invention.
Figure 5:
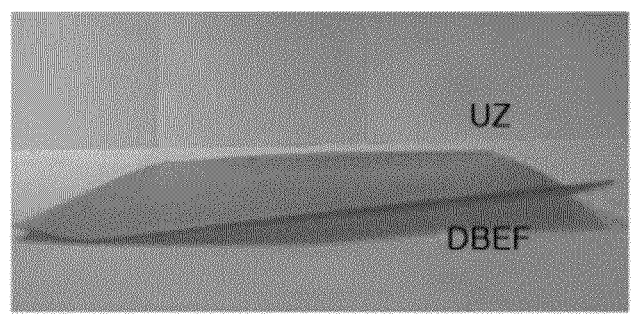
FIG. 5 is a photograph obtained by capturing a polarizing plate fabricated according to Comparative Example of the present invention.

Curling generation degrees of the polarizing plates fabricated according to Embodiment Example and Comparative Example were measured through naked eyes. FIG. 4 is a photograph obtained by capturing the polarizing plate fabricated according to Embodiment Example of the present invention. FIG. 5 is a photograph obtained by capturing a polarizing plate fabricated according to Comparative Example. In this case, the respective polarizing plates were placed such that the surfaces thereof to which the luminance enhancement film was attached faced downward.

As shown in FIGS. 4 and 5, it can be seen that, in the case of the polarizing plate according to Comparative Example, the corner portion of the polarizing plate faces in an upward direction, generating negative curling, while in the case of the polarizing plate according to Embodiment Example, the corner portion of the polarizing plate faces in a downward direction, generating positive curling.

Experimental Example 2

Figure 6:
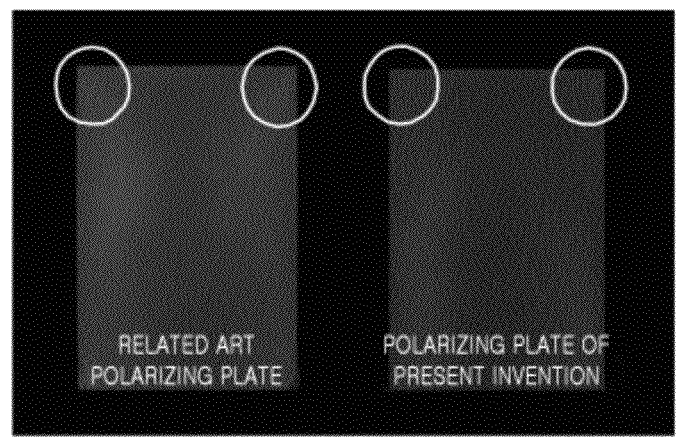
FIG. 6 is a photograph of a corner light leakage phenomenon of an IPS mode LCD in which the polarizing plates fabricated according to Embodiment Example and Comparative Example of the present invention are installed.

The polarizing plates fabricated according to Embodiment Example and Comparative Example were mounted in an 17-inch IPS mode LCD monitor and a light leakage phenomenon was observed. FIG. 6 is photograph obtained by capturing the monitor with the polarizing plate according to Embodiment Example attached thereto and the monitor with the polarizing plate according to Comparative Example attached thereto.

As shown in FIG. 6, it can be seen that the corner light leakage phenomenon was significantly reduced when the polarizing plate according to Embodiment Example was mounted.

As set forth above, unlike the related art luminance enhancement film-attached polarizing plate, in the luminance enhancement film-attached polarizing plate according to an embodiment of the present invention, since a central surface of the polarizing plate is upwardly convex, generating curling in a positive direction, after the luminance enhancement film is attached, a corner light leakage phenomenon can be improved. Also, since only one sheet of protective film is used, the polarizing plate can become thinner and more lightweight.

In addition, since the adhesive resin including a PVA resin having an acrylic group and the hydroxyl group is used as an adhesive of the polarizing plate according to an embodiment of the present invention, durability and water resistance of the polarizing plate can be enhanced.

While the present invention has been shown and described in connection with the embodiments, it will be apparent to those skilled in the art that modifications and variations can be made without departing from the spirit and scope of the invention as defined by the appended claims.

What is claimed is:

1. A polarizing plate comprising:
a polarizing element;
a first adhesive layer formed on a first surface of the polarizing element;
a second adhesive layer formed on a second surface of the polarizing element disposed on the opposite side of the first surface;
a protective film attached to the first adhesive layer;
a bonding layer attached to the second adhesive layer; and
a luminance enhancement film attached to the bonding layer,
wherein the first adhesive layer and the second adhesive layer are made of an adhesive resin including a PVA resin having an acrylic group and a hydroxyl group.

2. The polarizing plate of claim 1, wherein the PVA resin having an acrylic group and a hydroxyl group includes recurring units expressed by Chemical Formula 1a shown below and recurring units expressed by Chemical Formula 1b shown below:

[Chemical Formula 1a]

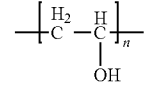

[Chemical Formula 1b]

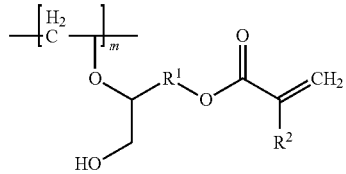

wherein n is an integer ranging from 480 to 1700, m is an integer ranging from 10 to 900, and n+m is an integer ranging from 500 to 1800, $R^1$ is a substituted or unsubstituted $C_1$-$C_{20}$ alkandiyl; a substituted or unsubstituted 1 to 7-membered cyclic compound; a substituted or unsubstituted 1 to 7-membered heterocyclic compound including a hetero atom selected from the group consisting of N, S, and O; a substituted or unsubstituted $C_6$-$C_{14}$ aromatic compound; or a substituted or unsubstituted 1 to 7-membered hetero aromatic compound including a hetero atom selected from the group consisting of N, S, and O, and $R^2$ is a substituted or unsubstituted $C_1$-$C_{20}$ alkyl group; a substituted or unsubstituted 1 to 7-membered cyclic compound; a substituted or unsubstituted 1 to 7-membered heterocyclic compound including a hetero atom selected from the group consisting of N, S, and O; a substituted or unsubstituted $C_6$-$C_{14}$ aromatic compound; or a substituted or unsubstituted 1 to 7-membered hetero aromatic compound including a hetero atom selected from the group consisting of N, S, and O, and when $R^1$ and $R^2$ are substituted with a substituent, the substituent is a $C_1$-$C_{20}$ alkyl group or a halogen atom selected from the group consisting of F, Cl, Br, and I.

3. The polarizing plate of claim 1, wherein the PVA resin having an acrylic group and a hydroxyl group further includes recurring units expressed by Chemical Formula 1c shown below

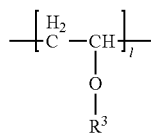

wherein n is an integer ranging from 480 to 1700, m is an integer ranging from 10 to 900, l is an integer ranging from 1 to 80, n+m is an integer ranging from 500 to 1800, n+l is an integer ranging from 490 to 1700, and n+m+l is an integer ranging from 500 to 1800, and $R^3$ is an acetoacetyl group, a carboxylic acid group, an acryl group, or a urethane group.

4. The polarizing plate of claim 1, wherein the adhesive resin additionally includes an initiator configured as an AIBN-based initiator or a persulfate-based water-soluble initiator.

5. The polarizing plate of claim 4, wherein a maximum 10 wt % of the initiator based on the weight of the adhesive resin is added.

6. The polarizing plate of claim 1, wherein the bonding layer includes first bonding layer and second bonding layer, each having a different modulus.

7. The polarizing plate of claim 6, wherein the modulus of the first bonding layer ranges from about 1 to 500 MPa, and the modulus of the second bonding layer ranges from about 0.01 to 0.5 MPa.

8. The polarizing plate of claim 6, wherein the first bonding layer is attached to the second adhesive layer.

9. The polarizing plate of claim 1, wherein the luminance enhancement film is a multilayer reflective polarizer.

10. The polarizing plate of claim 1, wherein the luminance enhancement film is a nano-wire grid polarizer including a transparent film, a nano-structure formed on one surface of the transparent film, and a metal layer formed on the nano-structure.

11. A display device comprising the polarizing plate of claim 1.

12. A polarizing plate, comprising:
a polarizing element;
a first adhesive layer formed on a first surface of the polarizing element;
a second adhesive layer formed on a second surface of the polarizing element disposed on the opposite side of the first surface;
a protective film attached to the first adhesive layer;
a bonding layer attached to the second adhesive layer; and
a luminance enhancement film attached to the bonding layer,
wherein the first adhesive layer and the second adhesive layer are made of an adhesive resin including 100 parts by weight of a PVA resin and 0.01 to 10 parts by weight of a compound having an epoxy group and an acrylic group.

13. The polarizing plate of claim 12, wherein the compound having an epoxy group and an acryl group is a compound expressed by Chemical Formula 3 shown below:

[Chemical Formula 3]

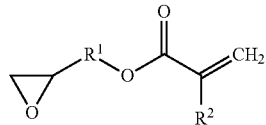

wherein $R^1$ is a substituted or unsubstituted alkandiyl; a substituted or unsubstituted 1 to 7-membered cyclic compound; a substituted or unsubstituted 1 to 7-membered heterocyclic compound including a hetero atom selected from the group consisting of N, S, and O; a substituted or unsubstituted $C_6$-$C_{14}$ aromatic compound; or a substituted or unsubstituted 1 to 7-membered hetero aromatic compound including a hetero atom selected from the group consisting of N, S, and O, and $R^2$ is a substituted or unsubstituted $C_1$-$C_{20}$ alkyl group; a substituted or unsubstituted 1 to 7-membered cyclic compound; a substituted or unsubstituted 1 to 7-membered heterocyclic compound including a hetero atom selected from the group consisting of N, S, and O; a substituted or unsubstituted $C_6$-$C_{14}$ aromatic compound; or a substituted or unsubstituted 1 to 7-membered hetero aromatic compound including a hetero atom selected from the group consisting of N, S, and O, and when $R^1$ and $R^2$ are substituted with a substituent, the substituent is a $C_1$-$C_{20}$ alkyl group or a halogen atom selected from the group consisting of F, Cl, Br, and I.

14. The polarizing plate of claim 12, wherein the PVA resin has a polymerization degree ranging from about 500 to 1800.

15. The polarizing plate of claim 12, wherein the adhesive resin additionally includes an initiator configured as an AIBN-based initiator or a persulfate-based water-soluble initiator.

16. The polarizing plate of claim 15, wherein a maximum 10 wt % of the initiator based on the weight of the adhesive resin is added.

17. The polarizing plate of claim 12, wherein the bonding layer includes a first bonding layer and a second bonding layer, each having a different modulus.

18. The polarizing plate of claim 17, wherein the modulus of the first bonding layer ranges from about 1 to 500 MPa, and the modulus of the second bonding layer ranges from about 0.01 to 0.5 MPa.

19. The polarizing plate of claim 18, wherein the first bonding layer is attached to the second adhesive layer.

20. The polarizing plate of claim 12, wherein the luminance enhancement film is a multilayer reflective polarizer.

21. The polarizing plate of claim 12, wherein the luminance enhancement film is a nano-wire grid polarizer including a transparent film, a nano-structure formed on one surface of the transparent film, or a metal layer formed on the nano-structure.

22. A display device, comprising the polarizing plate of claim 12.

* * * * *